(12) United States Patent
Magner et al.

(10) Patent No.: US 11,686,263 B1
(45) Date of Patent: Jun. 27, 2023

(54) METHODS AND SYSTEMS FOR CONTROLLING SELECTIVE CATALYTIC REDUCTANT CATALYST OF A GASOLINE ENGINE

(71) Applicant: Ford Global Technologies, LLC, Dearborn, MI (US)

(72) Inventors: Stephen William Magner, Farmington Hills, MI (US); Michiel J. Van Nieuwstadt, Ann Arbor, MI (US); Michael Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/647,303

(22) Filed: Jan. 6, 2022

(51) Int. Cl.
  *F02D 41/02* (2006.01)
  *F01N 3/20* (2006.01)
  *F02D 41/14* (2006.01)
  *F01N 3/10* (2006.01)

(52) U.S. Cl.
  CPC ......... *F02D 41/0235* (2013.01); *F01N 3/101* (2013.01); *F01N 3/2066* (2013.01); *F02D 41/1454* (2013.01); *F01N 3/206* (2013.01); *F01N 3/208* (2013.01); *F01N 2560/021* (2013.01); *F01N 2610/02* (2013.01); *F01N 2900/04* (2013.01); *F01N 2900/14* (2013.01); *F01N 2900/1402* (2013.01); *F01N 2900/1616* (2013.01); *F01N 2900/1624* (2013.01); *F02D 2200/08* (2013.01)

(58) Field of Classification Search
CPC combination set(s) only.
See application file for complete search history.

(56) References Cited

U.S. PATENT DOCUMENTS

| | | | |
|---|---|---|---|
| 6,119,452 A * | 9/2000 | Kinugasa | B01D 53/9454 60/285 |
| 8,091,342 B2 | 1/2012 | Perry et al. | |
| 8,424,289 B2 | 4/2013 | Narayanaswamy et al. | |
| 8,661,788 B2 | 3/2014 | Qi et al. | |
| 8,931,257 B2 | 1/2015 | Narayanaswamy et al. | |
| 8,993,475 B2 | 3/2015 | Kimura et al. | |
| 9,222,420 B2 | 12/2015 | Kerns et al. | |
| 9,810,118 B2 | 11/2017 | Gandhi et al. | |
| 10,221,792 B2 | 3/2019 | Santillo et al. | |
| 10,947,910 B2 | 3/2021 | Magner et al. | |
| 10,961,889 B2 | 3/2021 | Hoehne et al. | |
| 2010/0071347 A1* | 3/2010 | Yoshida | F02D 41/0275 60/276 |
| 2010/0186391 A1 | 7/2010 | Najt et al. | |

(Continued)

OTHER PUBLICATIONS

Van Nieuwstadt, M. et al., "Methods and System for Controlling Selective Catalytic Reductant Catalyst of a Gasoline Engine," U.S. Appl. No. 17/107,734, filed Nov. 30, 2020, 34 pages.

*Primary Examiner* — Binh Q Tran
(74) *Attorney, Agent, or Firm* — Vincent Mastrogiacomo; McCoy Russell LLP

(57) ABSTRACT

Systems and methods for controlling a gasoline urea selective catalytic reductant catalyst are described. In one example, an observer is provided that corrects an estimate of an amount of $NH_3$ that is stored in a SCR. The amount of $NH_3$ that is stored in the SCR is a basis for generating additional $NH_3$ or ceasing generation of $NH_3$.

18 Claims, 9 Drawing Sheets

(56) References Cited

U.S. PATENT DOCUMENTS

| | | | |
|---|---|---|---|
| 2013/0025261 A1* | 1/2013 | Sun | F01N 11/00 |
| | | | 60/276 |
| 2015/0285118 A1* | 10/2015 | Irisawa | F01N 13/02 |
| | | | 60/285 |
| 2018/0171910 A1* | 6/2018 | Tanaka | F02D 41/1463 |
| 2020/0248608 A1* | 8/2020 | Joo | F01N 3/2066 |

* cited by examiner

METHODS AND SYSTEMS FOR CONTROLLING SELECTIVE CATALYTIC REDUCTANT CATALYST OF A GASOLINE ENGINE

FIELD

The present description relates to methods and a system for controlling storage of $NH_3$ in a selective catalytic reductant catalyst. The methods and systems may be particularly useful for vehicles that include a gasoline engine and a three-way catalyst.

BACKGROUND AND SUMMARY

A vehicle may include a three-way catalyst to convert hydrocarbons, CO, and NO to $H_2O$, $CO_2$, and $N_2$. The three-way catalyst may generate $NH_3$ when engine exhaust gases are richer than stoichiometric exhaust gases for combusting gasoline. The $NH_3$ may be oxidized in the exhaust system downstream of the three-way catalyst to form $NO_x$. A selective catalytic reductant catalyst (SCR) may be positioned in an exhaust system downstream of the three-way catalyst to store the $NH_3$ and convert it to $N_2$ and $H_2O$ via the $NH_3$ reacting with $NO_x$. However, the $NH_3$ may slip past the SCR and exit to atmosphere or NO may not be converted if the SCR storage of $NH_3$ is too low. Therefore, it may be desirable to determine and control an amount of $NH_3$ stored in a SCR.

The inventors herein have recognized the above-mentioned issues and have developed a method for operating an engine including estimating an amount of $NH_3$ stored in a selective catalytic reductant catalyst (SCR) via a controller and adjusting an air/fuel ratio in response to the amount of $NH_3$ stored in the SCR being less than a threshold $NH_3$ store. In this way, CO generation may be mitigated when providing ammonia to the SCR.

By estimating an amount of $NH_3$ slip past a SCR according to output of a first oxygen sensor and output of a second oxygen sensor, it may be possible to provide the technical result of correcting output of a $NH_3$ storage model for a SCR. In particular, times of upstream (e.g., a catalyst monitor oxygen sensor) oxygen sensor switching and downstream (e.g., a tail pipe oxygen sensor) oxygen sensor switching may be indicative of $NH_3$ slip past a SCR when a temperature of the SCR is increasing. The $NH_3$ slip may be used as a basis for correcting the $NH_3$ storage model so that an amount of $NH_3$ stored in a SCR may be held in a desired operating range.

The present description may provide several advantages. In particular, the approach may improve NO emissions control for gasoline vehicles. In addition, the approach may be implemented at lower cost than systems that rely on NOx sensors. Further, the approach may provide different routines for flowing ammonia to the SCR based on an ammonia demand.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
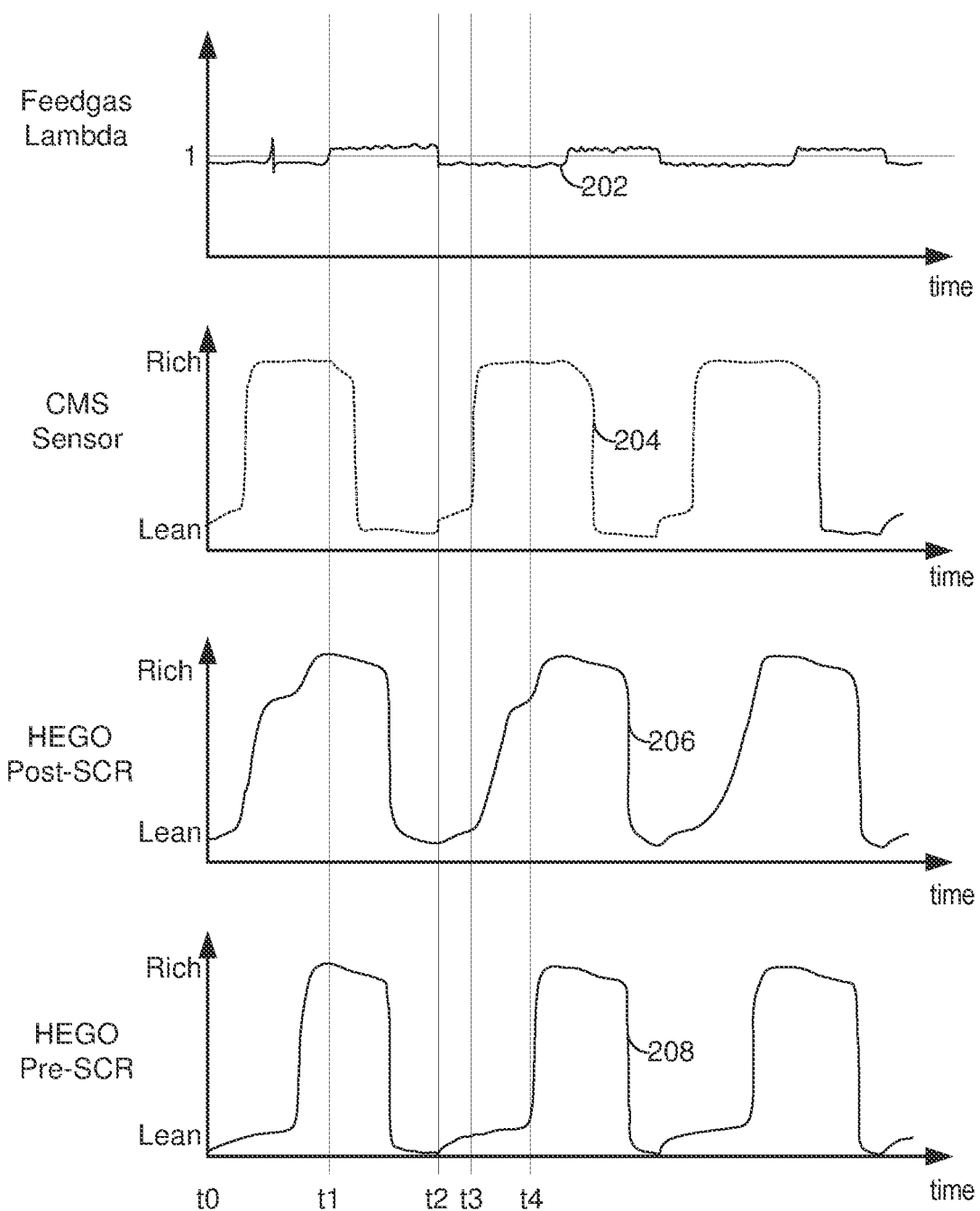
FIGS. 2 and 3 show oxygen sensor switching sequences.
Figure 3:
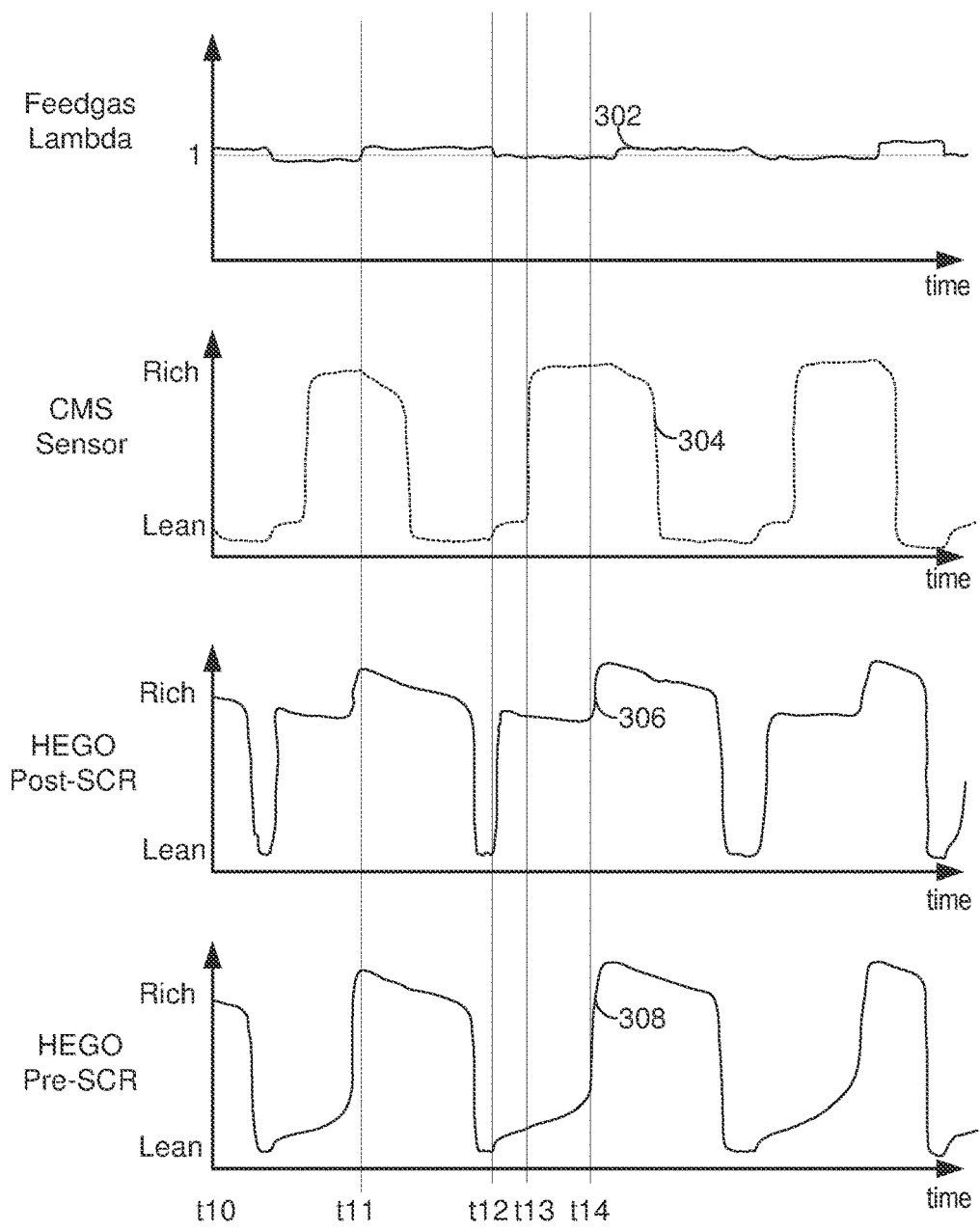
Figure 5:
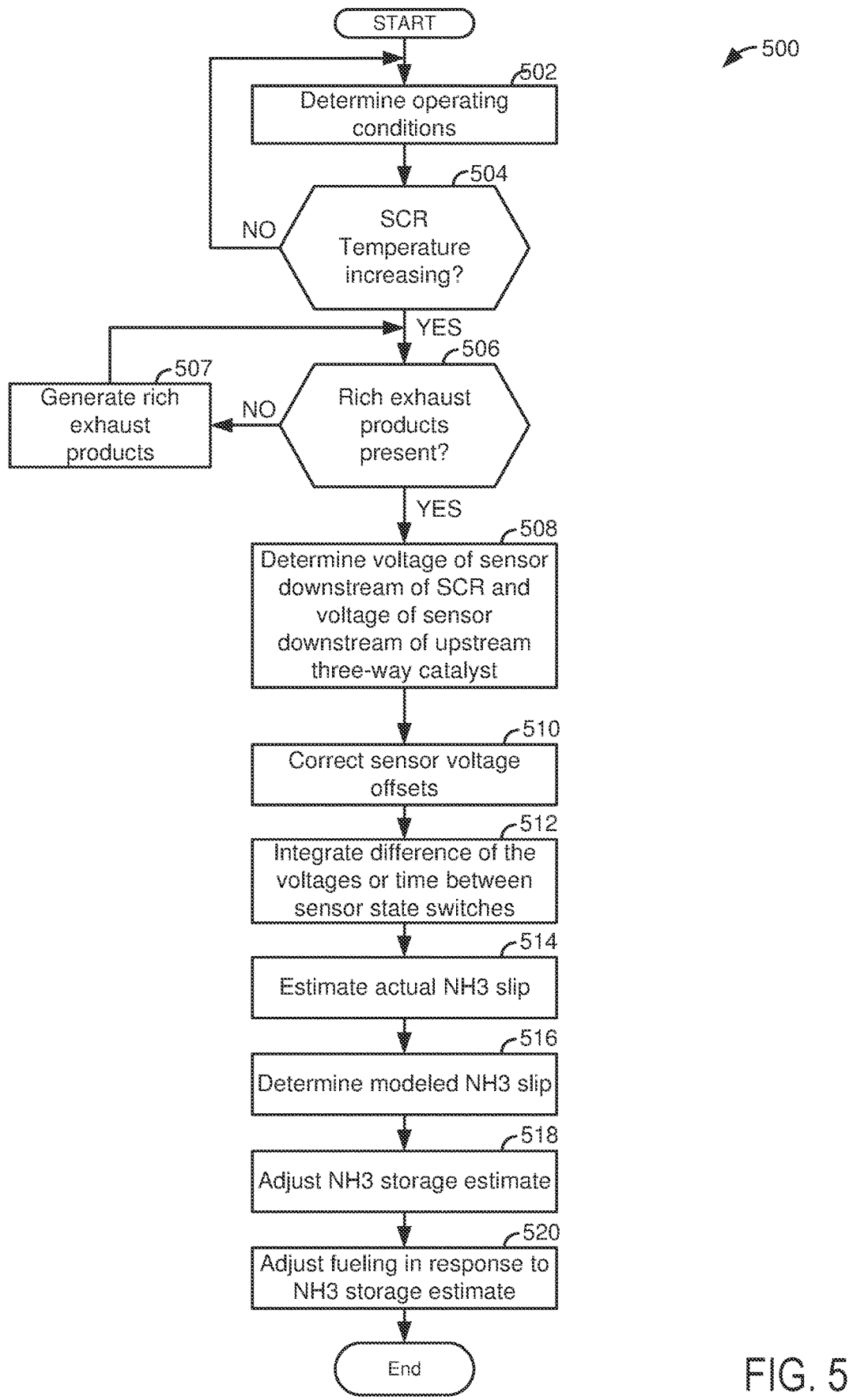
FIG. 5 shows a flowchart of a first method for controlling NO and $NH_3$ of a gasoline vehicle that is equipped with a SCR and two oxygen sensors.
Figure 6:
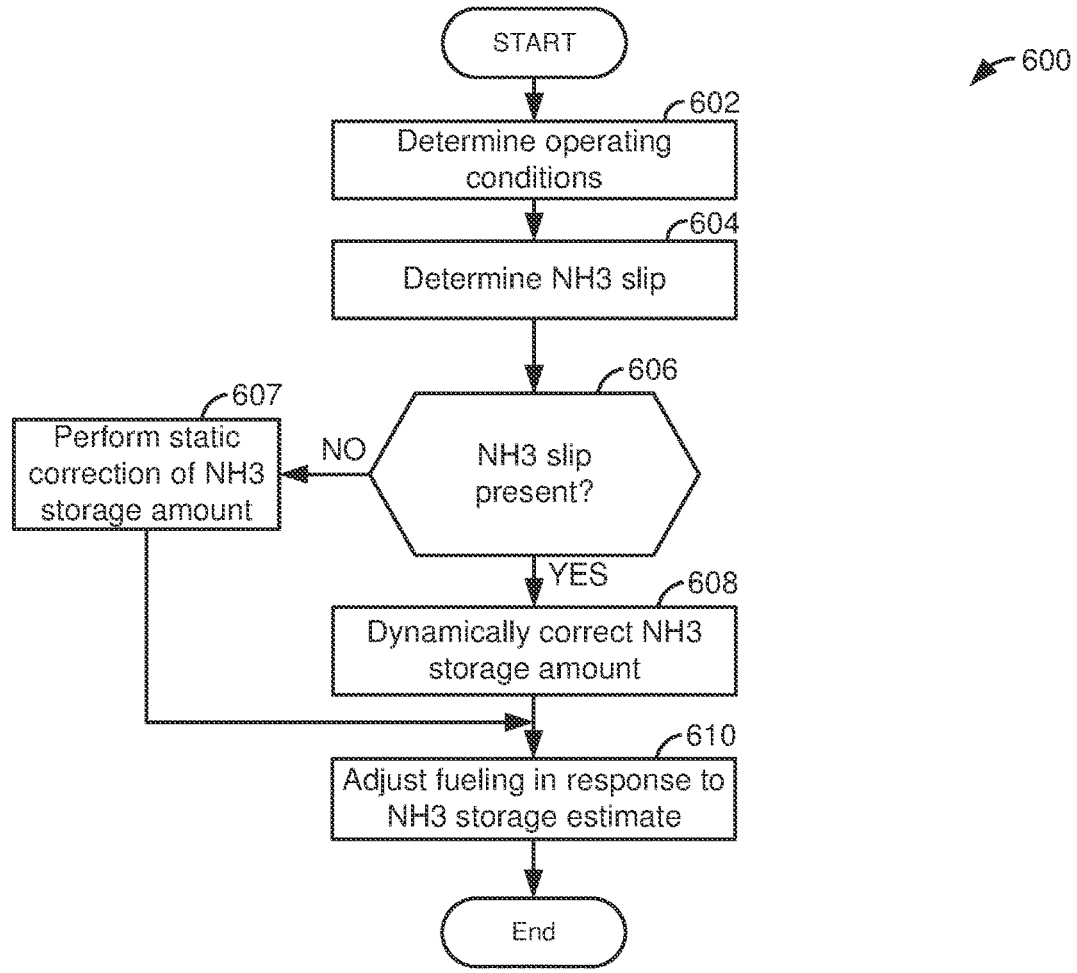
FIG. 6 shows a flowchart of a method for controlling NO and $NH_3$ of a gasoline vehicle that is equipped with a SCR and a NO or $NH_3$ sensor.
Figure 7:
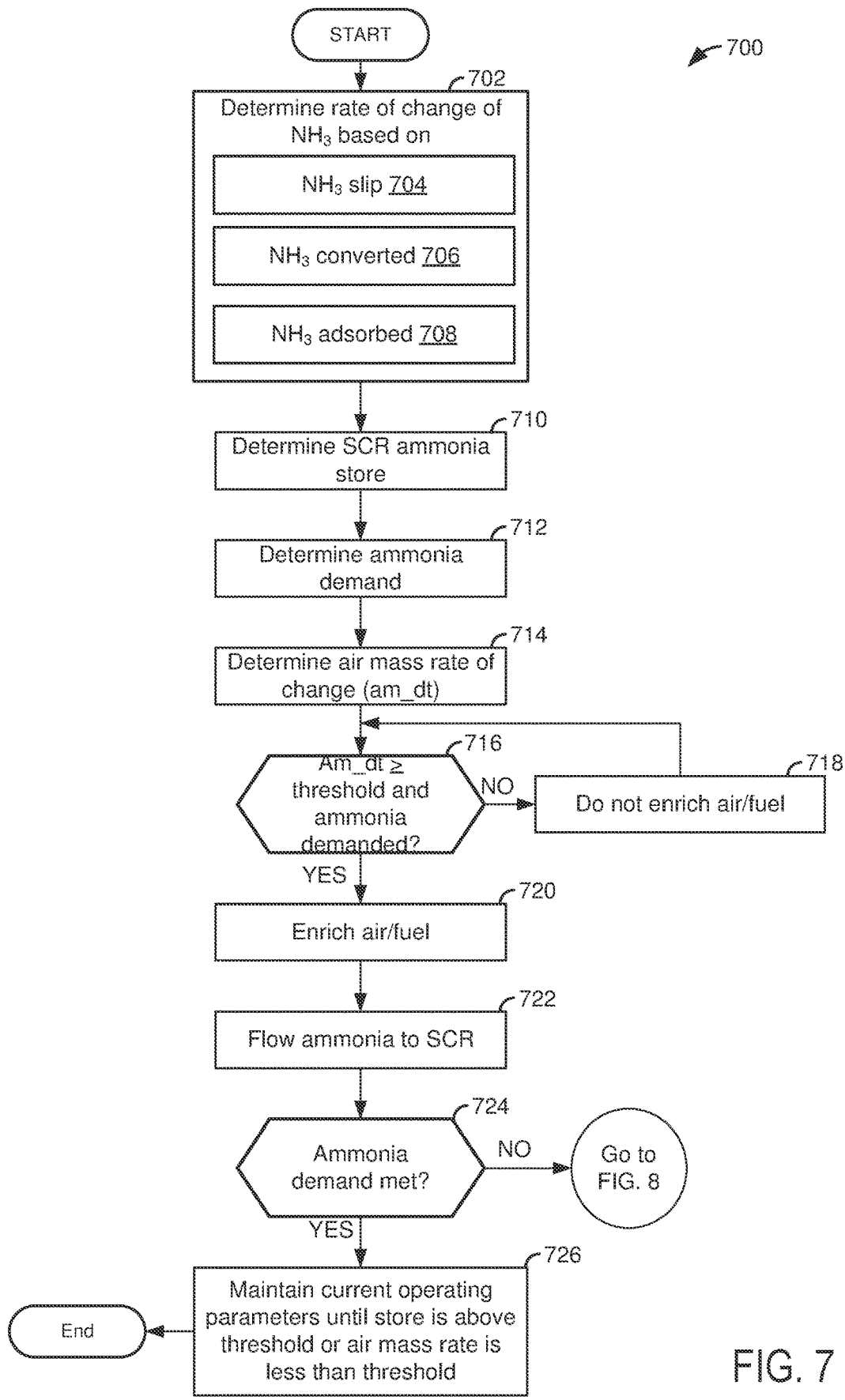
FIG. 7 shows a first method for providing $NH_3$ to the SCR via adjusting an AFR of a portion of a three-way catalyst (TWC).
Figure 8:
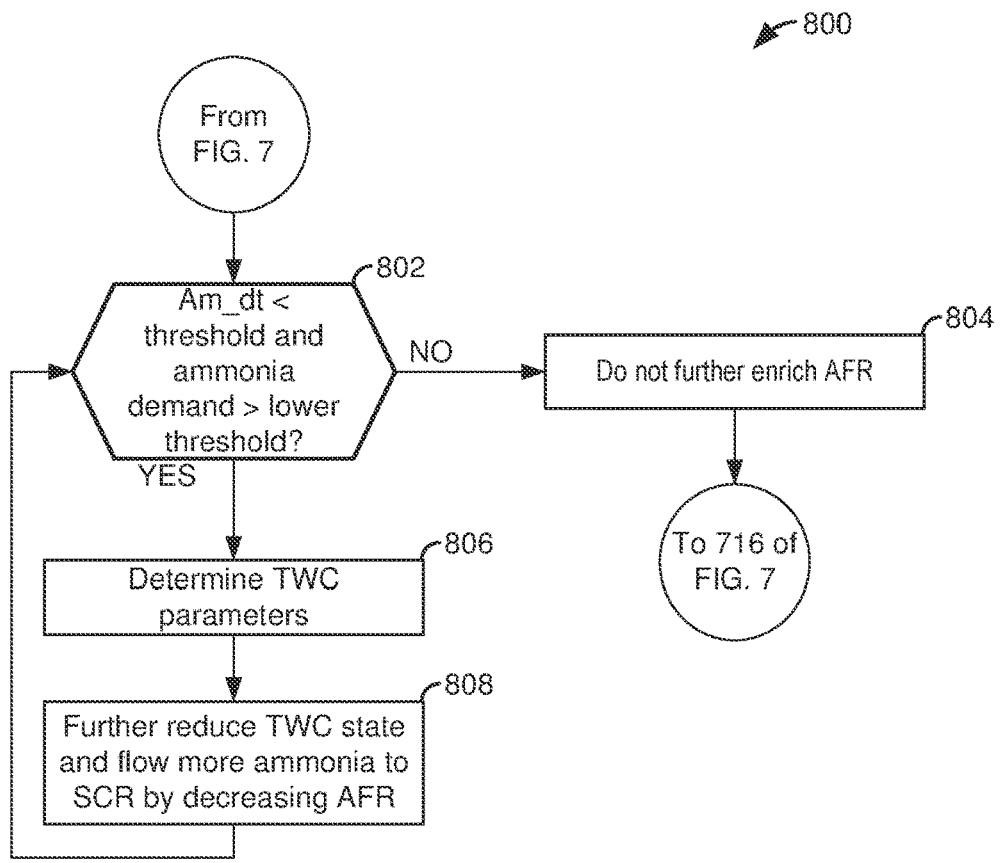
FIG. 8 shows a second method for providing $NH_3$ to the SCR if an amount of $NH_3$ provided by the method of FIG. 7 does not satisfy an ammonia demand of the SCR.
Figure 9:
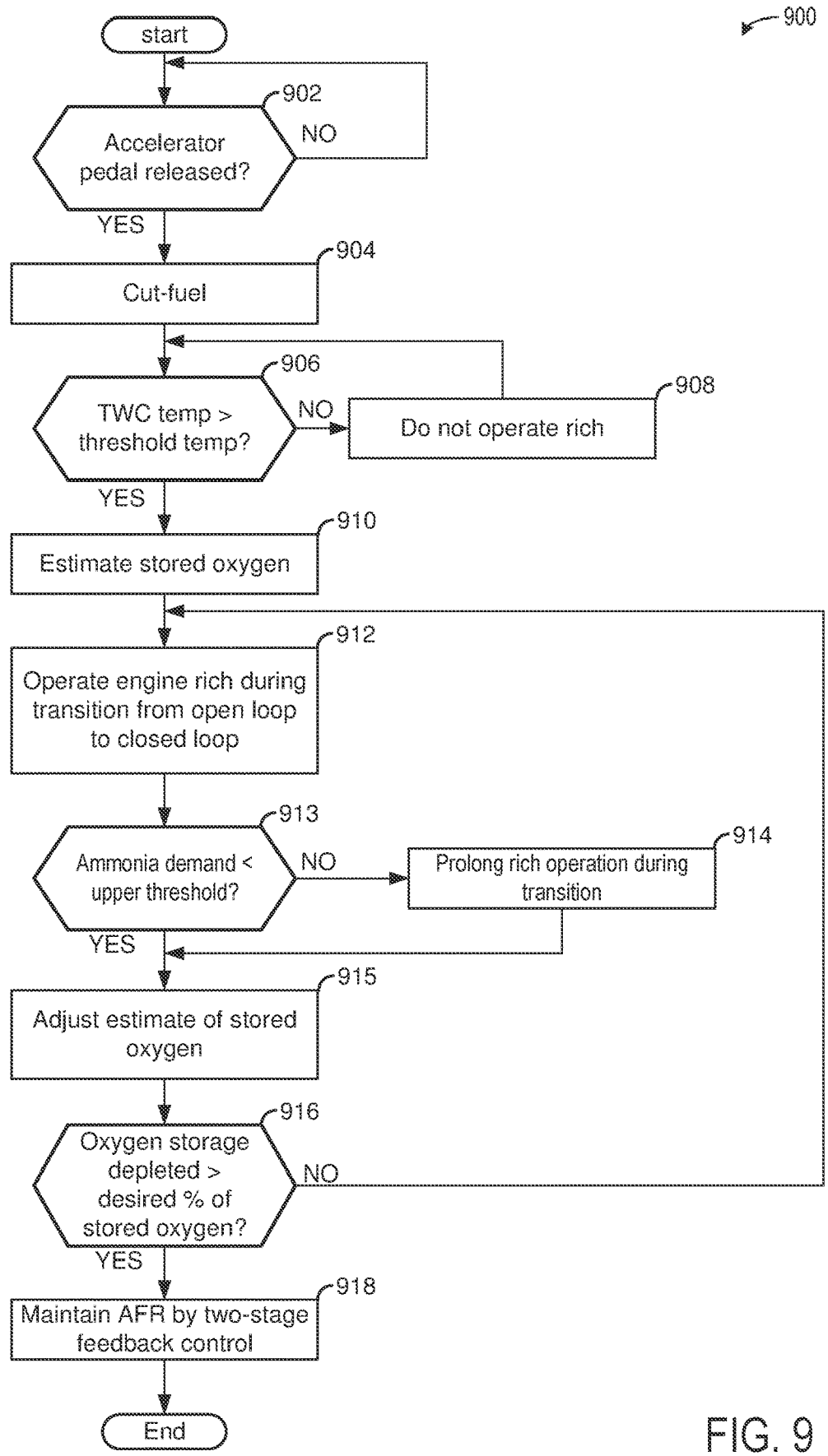
FIG. 9 shows a third method for providing $NH_3$ to the SCR when transitioning from open loop TWC reactivation to closed loop operation.
Figure 10A:
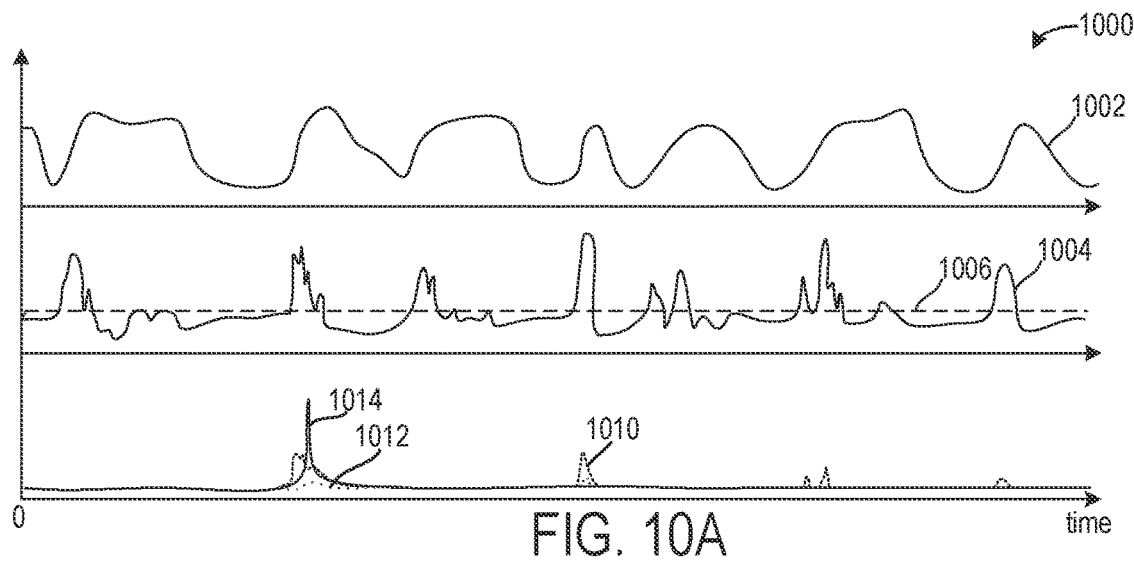
FIGS. 10A, 10B, and 10C show drive cycles illustrating a set point adder being disable, the set point adder being enabled, and generating ammonia while the set point adder is disabled.
Figure 10B:
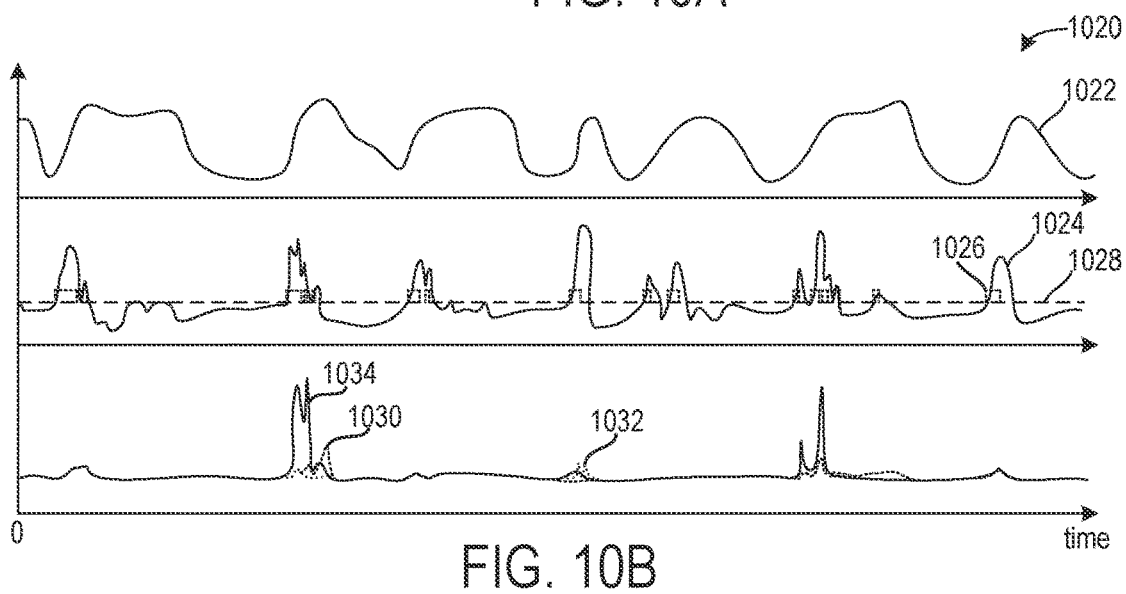
Figure 10C:
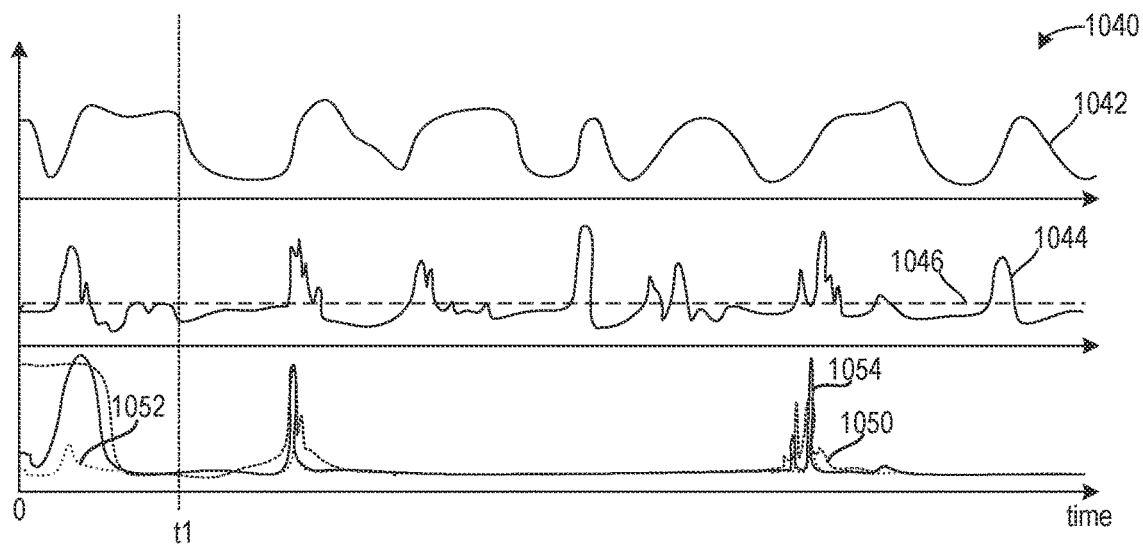

The present description is related to improving control of NO emitted from an engine. The engine may include an after treatment system that includes a three-way catalyst and a SCR. The SCR may be positioned downstream from one or more three-way catalyst in a direction of exhaust flow. The SCR may store $NH_3$ and convert the $NH_3$ to $N_2$ and $H_2O$ via NOx that enters the SCR. The engine may be of the type shown in FIG. 1. In one example, storage of $NH_3$ may be based on slip of $NH_3$ through the SCR as inferred from two oxygen sensors. In other examples, storage of $NH_3$ may be based on slip of $NH_3$ through the SCR as inferred from a NOx or $NH_3$ sensor. FIGS. 2 and 3 show oxygen sensor switching sequences to illustrate how output of two oxygen sensors may be a basis for determining $NH_3$ slip through the SCR. Outputs of two oxygen sensors are plotted side by side in FIG. 4 to show an area between curves that may be indicative of $NH_3$ slip past an SCR. FIGS. 5 and 6 show two methods for controlling NOx and $NH_3$ of a vehicle. The methods may model $NH_3$ storage and correct output of an $NH_3$ storage model via an observer. FIG. 7 shows a first method for providing $NH_3$ to the SCR via adjusting an AFR of a portion of a three-way catalyst (TWC). FIG. 8 shows a second method for providing $NH_3$ to the SCR if an amount of $NH_3$ provided by the method of FIG. 7 does not satisfy an ammonia demand of the SCR. FIG. 9 shows a third method for providing $NH_3$ to the SCR when transitioning from open loop TWC reactivation. FIGS. 10A, 10B, and 10C show drive cycles illustrating a set point adder being disable, the set point adder being enabled, and generating ammonia while the set point adder is disabled.

Figure 1:
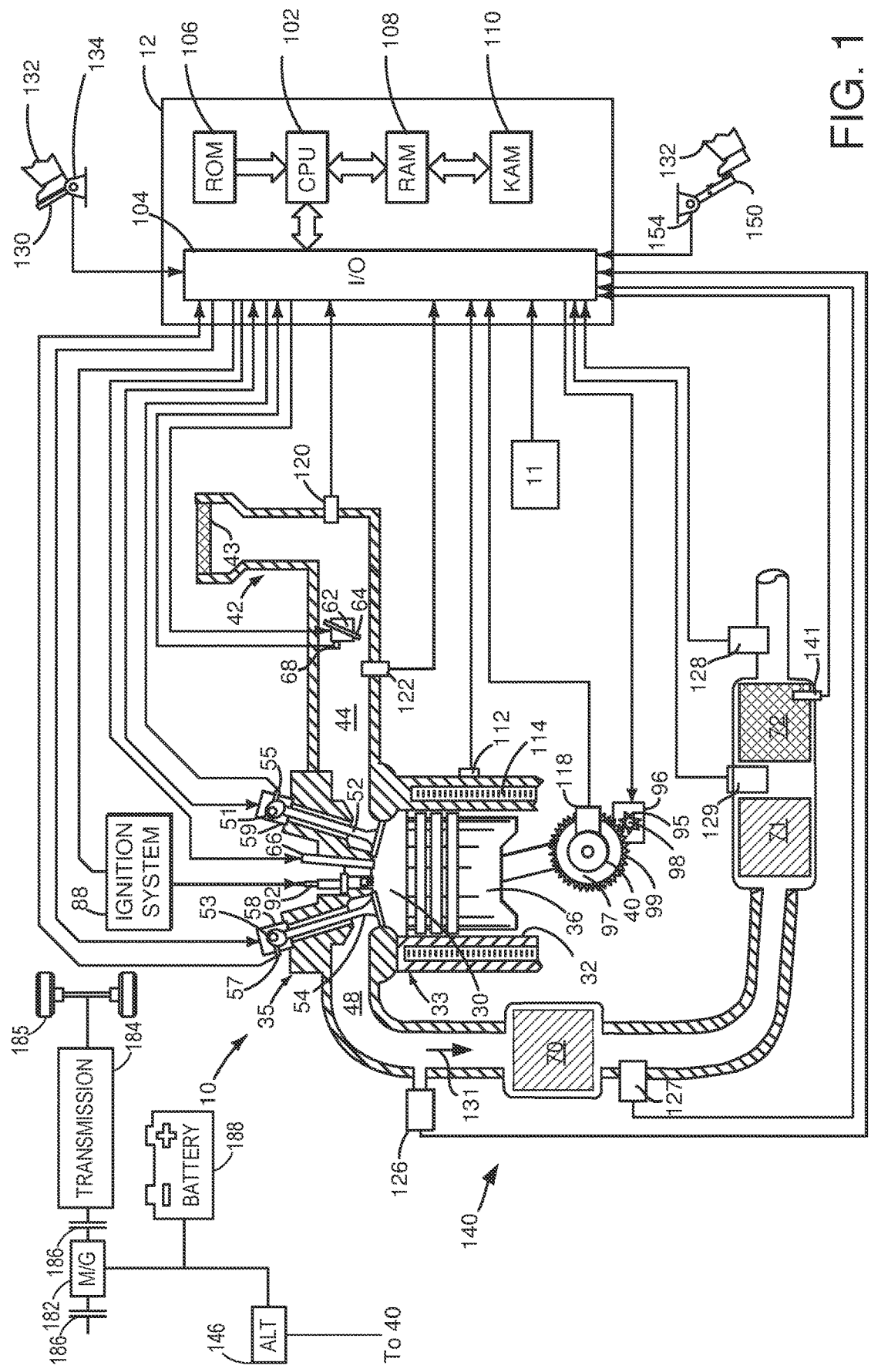
FIG. 1 is a schematic diagram of an engine and aftertreatment system.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIG. 1. The controller may employ the actuators shown in FIG. 1 to adjust engine operation based on the received signals and instructions stored in memory of controller 12.

Engine 10 is comprised of cylinder head 35 and block 33, which include combustion chamber 30 and cylinder walls 32. Combustion chamber 30 may alternatively be referred to as a cylinder. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99 and crankshaft 40. Ring gear 99 is directly coupled to crankshaft 40. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Fuel injector 66 is shown protruding into combustion chamber 30 and it is positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

Optional electronic throttle 62 adjusts a position of throttle plate 64 to control air flow to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of light-off three-way catalytic converter 70. Alternatively, a two-state heated exhaust gas oxygen (HEGO) sensor may be substituted for UEGO sensor 126. A second HEGO sensor, which may be referred to as a catalyst monitor sensor (CMS) 127 is positioned in after treatment system 140 downstream of light-off three-way catalyst 70 according to a direction of exhaust flow as indicated by arrow 131. A third sensor 128, which may be a HEGO, NOx, or $NH_3$ sensor, is positioned downstream of second three-way catalyst 71 and SCR 72. In some examples, a pre-SCR oxygen sensor 129 may be provided and it may be positioned in after treatment system 140 downstream of three-way catalyst 71 and upstream of SCR 72. Temperature of the SCR may be determined via temperature sensor 141.

In some examples, vehicle may be a hybrid vehicle, such as a plug-in hybrid electric vehicle (PHEV) or a full hybrid electric vehicle (FHEV), with multiple sources of torque available to one or more vehicle wheels 185. In other examples, vehicle is a conventional vehicle with only an engine. In the example shown, vehicle includes engine 10 and an electric machine 182. Electric machine 182 may be a motor or a motor/generator. Crankshaft 40 of engine 10 and electric machine 182 are connected via transmission 184 to vehicle wheels 185 when one or more clutches 186 are engaged. In the depicted example, a first clutch 186 is provided between crankshaft 40 and electric machine 182, and a second clutch 186 is provided between electric machine 182 and transmission 184. Controller 12 may send a signal to an actuator of each clutch 186 to engage or disengage the clutch, so as to connect or disconnect crankshaft 40 from electric machine 182 and the components connected thereto, and/or connect or disconnect electric machine 182 from transmission 184 and the components connected thereto. Transmission 184 may be a gearbox, a planetary gear system, or another type of transmission.

The powertrain may be configured in various manners, including as a parallel, a series, or a series-parallel hybrid vehicle. In electric vehicle embodiments, a system battery 188 may be a traction battery that delivers electrical power to electric machine 182 to provide torque to vehicle wheels 185. In some embodiments, electric machine 182 may also be operated as a generator to provide electrical power to charge system battery 188, for example, during a braking operation. It will be appreciated that in other embodiments, including non-electric vehicle embodiments, system battery 58 may be a typical starting, lighting, ignition (SLI) battery coupled to an alternator 46.

Alternator 146 may be configured to charge system battery 188 using engine torque via crankshaft 40 during engine running. In addition, alternator 146 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 146 in order to regulate the power output of the alternator based upon system usage requirements, including auxiliary system demands.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive force pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system including an engine and a three-way catalyst (TWC) in an exhaust system of the engine. A selective catalytic reductant catalyst (SCR) is positioned in the exhaust system at a location downstream of the three-way catalyst relative to a direction of exhaust gas flow. A sensor is positioned in the exhaust system at a location downstream of the SCR. A controller including executable instructions stored in non-transitory memory that cause the controller to generate a correction value for an amount of $NH_3$ stored in the SCR based on a difference between output of the sensor and output of a $NH_3$ storage model, and instructions to adjust the output of the $NH_3$ storage model according to the difference and adjust an amount of fuel supplied to the engine responsive to output of the $NH_3$ storage model. The system includes where the sensor is a $NH_3$ sensor or a NOx sensor. The system further comprises additional instructions to adjust the output of the $NH_3$ storage model according to the correction value. The system includes where the $NH_3$ storage model is based on an exhaust gas Lambda value, SCR temperature, and exhaust flow rate. The system further comprises additional instructions to integrate output of the $NH_3$ storage model. The system includes where the $NH_3$ storage model is further based on an amount of NOx flowing into the SCR.

As will be described herein, the controller may adjust operating parameters to modify $NH_3$ output to the SCR based on the correction value. In one example, the correction value is based on an ammonia demand of the SCR.

Regarding FIG. 2, it shows switching of oxygen sensors in after treatment system 140 responsive to changes in engine air-fuel or Lambda values (e.g., Lambda=engine air-fuel ratio/stoichiometric air-fuel ratio). FIG. 2 shows oxygen sensor switching due to Lambda switching from rich to lean and vice-versa without $NH_3$ desorption (e.g., $NH_3$ slip) from the SCR.

The inventors have observed that an oxygen concentration observed by a downstream oxygen sensor that is positioned downstream of a SCR drops to a low level (e.g., 0) in response to a lean to rich engine air-fuel ratio switch. The output of the oxygen sensor that is positioned downstream of the SCR switches or changes state even before the oxygen storage of the upstream three-way catalyst and downstream three-way catalyst is depleted, which may cause a state change in the catalyst monitor oxygen sensor. The lean to rich air-fuel ratio switch coincides with $NH_3$ release, during a positive SCR temperature increase transient, $H_2$ generated from release of $NH_3$ or $NH_3$ itself may cause the downstream or tailpipe oxygen sensor to switch or change state before the catalyst monitor oxygen sensor switches state. The catalyst monitor oxygen sensor switches after the tailpipe oxygen sensor because the catalyst monitor oxygen sensor has to wait for reductant to deplete the oxygen storage in the upstream catalyst before the oxygen concentration in the exhaust gases cause it to switch state. The tailpipe oxygen sensor does not have to wait for oxygen depletion in the upstream catalyst to switch or change state due to the lean to rich air-fuel ratio change because the tailpipe oxygen sensor switches or changes state in response to $H_2$ from $NH_3$ or $NH_3$ itself.

The first plot from the top of FIG. 2 is a plot of engine Lambda (e.g., the Lambda value of the air and fuel mixture that is being combusted by the engine) versus time. The vertical axis represents engine Lambda and engine Lambda is less than one (e.g., rich) when trace 202 is below the label 1 on the vertical axis. Engine Lambda is greater than one (e.g., lean) when trace 202 is above the label 1 on the vertical axis. The horizontal axis represents time and time increases from the left side of the figure to the right side of the figure. Trace 202 represents the engine Lambda value.

The second plot from the top of FIG. 2 is a plot of output voltage of the CMS (e.g., 127 of FIG. 1) versus time. The vertical axis represents CMS voltage and CMS voltage increases in the direction of the vertical axis arrow. The CMS voltage at the level of the horizontal axis is zero. The horizontal axis represents time and time increases from the left side of the figure to the right side of the figure. Trace 204 represents the CMS voltage.

The third plot from the top of FIG. 2 is a plot of output voltage of a tailpipe or post-SCR sensor (e.g., 128 of FIG. 1) versus time. The vertical axis represents post-SCR sensor voltage and post SCR voltage increases in the direction of the vertical axis arrow. The post-SCR voltage at the level of the horizontal axis is zero. The horizontal axis represents time and time increases from the left side of the figure to the right side of the figure. Trace 206 represents the post-SCR voltage.

The fourth plot from the top of FIG. 2 is a plot of output voltage of a pre-SCR sensor (e.g., 129 of FIG. 1) versus time. The vertical axis represents pre-SCR sensor voltage and pre-SCR voltage increases in the direction of the vertical axis arrow. The pre-SCR voltage at the level of the horizontal axis is zero. The horizontal axis represents time and time increases from the left side of the figure to the right side of the figure. Trace 208 represents the pre-SCR voltage.

The output voltages of the CMS, post-SCR oxygen sensor, and pre-SCR oxygen sensor exhibit very high gains in when the oxygen sensors are exposed to Lambda=1 exhaust gases. The gain is so high that the oxygen sensor output voltage may be described as "switching" when the engine Lambda changes from rich to lean or vice-versa. The switching of the oxygen sensor may also be referred to as the oxygen sensor changing state from indicating lean (e.g., a lower voltage—voltage less than 0.4 volts) to indicating rich (e.g., a higher voltage—voltage greater than 0.6 volts) and vice-versa.

At time t0, the engine Lambda value has changed from a rich value (e.g., 0.9) to a lean value (e.g., 1.1). The CMS, post-SCR oxygen sensor, and pre-SCR oxygen sensor voltages are all indicating lean, but the voltages are increasing toward a rich indication.

At time t1, the engine Lambda value is changed from a rich value to a lean value. The CMS, post-SCR oxygen sensor, and pre-SCR oxygen sensor voltages are all indicating rich. Shortly thereafter, the CMS, post-SCR oxygen sensor, and pre-SCR oxygen sensor voltages are all indicating lean. The CMS switches from lean to rich first followed by the pre and post SCR oxygen sensors.

At time t2, the engine Lambda value is changed from lean to rich. The CMS switches from rich to lean at time t3. The post-SCR oxygen sensor switches next between time t3 and time t4, and the pre-SCR oxygen sensor switches last at time t4. Thus, it may be observed that the post-SCR oxygen sensor switches from indicating lean to indicating rich after the CMS switches from indicating lean to indicating rich when $NH_3$ slip is not present. $NH_3$ slip may not be present when SCR temperature is decreasing because storage capacity for $NH_3$ increases in the SCR as SCR temperature decreases. Accordingly, $NH_3$ storage capacity of the SCR decreases as temperature of the SCR increases.

Regarding FIG. 3, it shows switching of oxygen sensors in aftertreatment system 140 responsive to changes in engine air-fuel or Lambda values. FIG. 3 shows oxygen sensor switching due to Lambda switching from rich to lean and vice-versa with $NH_3$ desorption from the SCR.

The first plot from the top of FIG. 3 is a plot of engine Lambda versus time. The vertical axis represents engine Lambda and engine Lambda is less than one (e.g., rich) when trace 302 is below the label 1 on the vertical axis. Engine Lambda is greater than one (e.g., lean) when trace 302 is above the label 1 on the vertical axis. The horizontal axis represents time and time increases from the left side of the figure to the right side of the figure. Trace 302 represents the engine Lambda value.

The second plot from the top of FIG. 3 is a plot of output voltage of CMS sensor (e.g., 127 of FIG. 1) versus time. The vertical axis represents CMS sensor voltage and CMS voltage increases in the direction of the vertical axis arrow. The CMS voltage at the level of the horizontal axis is zero. The horizontal axis represents time and time increases from the left side of the figure to the right side of the figure. Trace 304 represents the CMS voltage.

The third plot from the top of FIG. 3 is a plot of output voltage of a tailpipe or post-SCR sensor (e.g., 128 of FIG. 1) versus time. The vertical axis represents post-SCR sensor voltage and post SCR voltage increases in the direction of the vertical axis arrow. The post-SCR voltage at the level of the horizontal axis is zero. The horizontal axis represents time and time increases from the left side of the figure to the right side of the figure. Trace 306 represents the post-SCR voltage.

The fourth plot from the top of FIG. 3 is a plot of output voltage of a pre-SCR sensor (e.g., 129 of FIG. 1) versus time. The vertical axis represents pre-SCR sensor voltage and pre-SCR voltage increases in the direction of the vertical axis arrow. The pre-SCR voltage at the level of the horizontal axis is zero. The horizontal axis represents time and time increases from the left side of the figure to the right side of the figure. Trace 308 represents the pre-SCR voltage.

At time t10, the engine Lambda value is lean. The CMS is indicating lean and the post-SCR oxygen sensor and the pre-SCR oxygen sensor voltages are all indicating rich.

At time t11, the engine Lambda value is changed from a rich value to a lean value. The CMS, post-SCR oxygen sensor, and pre-SCR oxygen sensor voltages are all indicating rich. Shortly thereafter, the CMS switches lean followed by the post-SCR oxygen sensor and the pre-SCR oxygen sensor switching lean before time t12.

At time t12, the engine Lambda value is changed from lean to rich. The post-SCR oxygen sensor switches rich coincident with time t12 or just after time t12. The CMS continues to indicate lean. The pre-SCR oxygen sensor also continues to indicate lean.

At time t13, the engine Lambda value continues on at a rich value. The post-SCR oxygen sensor continues to indicate rich conditions due to $H_2$ generated from $NH_3$ or from $NH_3$ itself released from the SCR. The CMS sensor switches from indicating lean to indicating rich. The pre-SCR oxygen sensor continues to indicate lean conditions.

The amount of time between time t12 (e.g., the switching time of the post-SCR oxygen sensor from lean to rich) and time t13 may be a basis for estimating $NH_3$ slip through the SCR. Alternatively, an area between curve 306 and curve 304 between time t12 and time t13 may be a basis for estimating $NH_3$ slip through the SCR as shown in FIG. 4.

At time t14, the engine Lambda value continues on at a rich value. The post-SCR oxygen sensor continues to indicate rich conditions due to $H_2$ generated from $NH_3$ or from $NH_3$ itself released from the SCR. The CMS sensor continues to indicate rich and the pre-SCR switches from indicating lean to indicating rich.

Thus, the inventors have established a way to estimate $NH_3$ slip via output of two oxygen sensors. In addition, as discussed in further detail below, the inventors have developed a way of correcting output of a $NH_3$ storage model for a SCR based on the $NH_3$ slip estimate.

Figure 4:
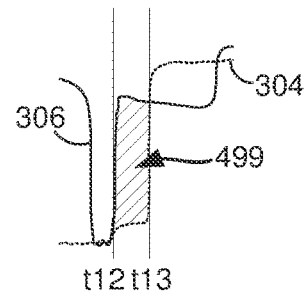
FIG. 4 is a plot showing how outputs of two oxygen sensors may be a basis for estimating slip of $NH_3$ through a SCR.

Referring now to FIG. 4, curves 304 and 306 from FIG. 3 are placed side by side to indicate an area between times t12 and t13 that may be indicative of NH₃ slip through the SCR. FIG. 4 shows a cross hatched area 499 between curves 306 and 304 in the time frame between time t12 and time t13. This area may be empirically mapped to an amount of NH₃ slip through the SCR. Alternatively, the amount of time between time t12 and time t13 may be empirically mapped to an amount of NH₃ slip through the SCR.

Referring now to FIG. 5, a method for controlling NO and NH₃ of a gasoline vehicle that is equipped with a SCR and two oxygen sensors that is based on a first observer is shown. The method of FIG. 5 may be incorporated into and may cooperate with the system of FIG. 1. Further, at least portions of the method of FIG. 5 may be incorporated as executable instructions stored in non-transitory memory of controller 12 while other portions of the method may be performed via a controller transforming operating states of devices and actuators in the physical world.

At 502, method 500 determines operation conditions. Operating conditions may include but are not limited to ambient temperature, engine temperature, engine speed, barometric pressure, engine intake manifold temperature, SCR temperature, operating states of oxygen sensors, NO sensors, and NH₃ sensors, and driver demand torque. The engine operating conditions may be determined via the various sensors described herein. Method 500 proceeds to 504.

At 504, method 500 judges if a temperature of the SCR is increasing. If so, the answer is yes and method 500 proceeds to 506. Otherwise, the answer is no and method 500 returns to 502. Alternatively, if the answer is no, method 500 may exit and execute again at a later time (e.g., 250 milliseconds later). Increasing SCR temperature may be indicative of reduced NH₃ storage capacity and NH₃ desorption from the SCR.

At 506, judges if a switch from lean feedgas exhaust gases to rich feedgas exhaust gases is present. In other words, method 500 judges if the engine has switched from operating with a lean air-fuel ratio to operating with a rich air-fuel ratio. Method 500 may determine a switch from lean feedgas exhaust gases to rich feedgas exhaust via UEGO 126. The switch from lean feedgas exhaust gases to rich feedgas exhaust gases may allow NH₃ slip through a SCR to be determined via output of two oxygen sensors. If method 500 determines that there is a switch from lean feedgas exhaust gases to rich feedgas exhaust gases, the answer is yes and method 500 proceeds to 508. Otherwise, the answer is no and method 500 proceeds to 507.

At 507, method 500 generates a switch from the engine producing lean feed gases to the engine producing rich feed gases. A switch from lean feedgas exhaust to rich feedgas exhaust may be provided via closed loop fuel control ramp and jump back techniques that stimulate three-way catalyst operation. Alternatively, a lean to rich switch may be generated when cylinders are reactivated after exiting a fuel cut-out mode. Further, a lean to rich switch may be generated during fuel enrichment to control catalyst temperature. Further still, method 500 may generate a transition from generating lean exhaust gases to generating rich exhaust gases in response to a request to correct output of a NH₃ storage model. The switch from generating lean feed gases to generating rich feed gases may be provided by increasing an amount of fuel that is injected to the engine. Method 500 returns to 506.

At 508, method 500 determines an output voltage from a tailpipe oxygen sensor that is positioned in after treatment system 140 downstream of the SCR in the direction of exhaust gas flow. Method 500 also determines output voltage of an oxygen sensor that is positioned downstream of a three-way catalyst (e.g., CMS sensor 127). The output voltages may be determined via the controller. Method 500 proceeds to 510.

At 510, method 500 corrects for offsets that may be in the voltages output from the two oxygen sensors that output the voltages determined at 508. Oxygen sensors may exhibit offsets at times due to sensor temperature changes, sensor contamination, and/or sensor aging. Method 500 may remove these offsets via determining a lowest oxygen sensor voltage over a predetermined time period and adding an offset voltage to determined oxygen sensor output voltages that move the lowest voltage value to a predetermined voltage level. For example, if over a two-minute period a lowest observed oxygen sensor voltage is −0.2 volts and a desired lowest oxygen sensor voltage is 0 volts, then 0.2 volts may be added to each voltage level that is output by the subject oxygen sensor and input to the controller. Method 500 proceeds to 512.

At 512, method 500 integrates an area between the offset voltage adjusted voltages output from the two oxygen sensors as determined at 510. In one example, the area that is integrated begins at the time when the tailpipe oxygen sensor switches from indicating lean to indicating rich, such as time t12 shown in FIG. 3. The area that is integrated ends at a time when the upstream oxygen sensor (e.g., CMS sensor 127) switches from indicating lean to indicating rich, such as time t13 in FIG. 3. Method 500 integrates the difference between the voltages of the two oxygen sensors, or more general, a function of those voltages which may be expressed as:

$$\text{Slip\_area} = \int_{t1}^{t2} (V_{CMS}) - f2(V_{TP})$$

where Slip_area is the area between the voltage output curves of the CMS sensor and the tailpipe oxygen sensor, t1 is the time that the tailpipe sensor switches from indicating lean to indicating rich, t2 is the time that the CMS switches from indicating lean to indicating rich, VCMS is the voltage output of the CMS, VTP is the voltage output of the tailpipe oxygen sensor, and the functions f1 and f2 map voltage to O₂ mass flow.

Alternatively, in some examples, method 500 may determine a difference in time between when the tailpipe oxygen sensor switches from indicating lean to indicating rich and the time when the upstream oxygen sensor (e.g., CMS sensor 127) switches from indicating lean to indicating rich. The slip time may be determined via the following equation:

$$\text{Slip\_time} = t1 - t2$$

where Slip_time is the amount of time between the voltage output curves of the CMS sensor and the tailpipe oxygen sensor, t1 is the time that the tailpipe sensor switches from indicating lean to indicating rich, t2 is the time that the CMS switches from indicating lean to indicating rich. Method 500 proceeds to 514.

At 514, method 500 estimates the amount of NH₃ slip. In one example, method 500 estimates the amount of NH₃ slip via empirically determined functions that map the area or the time determined at 512 to NH₃ slip. The functions may be determined via operating an engine system on a dynamometer and recording NH₃ levels that occur during lean to rich air-fuel ratio changes of the engine. Method 500 may estimate NH₃ via the following equations:

$$NH_3 slip = f(\text{Slip\_area})$$

Or $$NH_3 slip = f(\text{Slip\_time})$$

where NH$_3$ slip is the estimated amount of NH$_3$ that slips or passes by the SCR and f is a function that returns the amount of NH$_3$ slip. The amount of NH$_3$ that has slipped past the SCR may be referred to as an estimate of actual NH$_3$ slip. The NH$_3$ slip may be referred to as output of an observer since it is based on observed system output. Method 500 proceeds to 516.

At 516, method 500 determines an amount of modeled NH$_3$ slip. Method 500 may estimate the rate of change of NH$_3$ stored within the SCR via the following equation:

$$\frac{d}{dt}NH_3Stored = NH_3\ln(Lambda, ef, T) - NH_3Des(NH_3Stored, SCRT, ef, Lambda) - NH_3CVT(NOxSCR, T)$$

where d/dt NH$_3$Stored is the rate of change of NH$_3$ that is stored in the SCR, NH$_3$In is a function that returns the amount of NH$_3$ that enters the SCR, Lambda is the Lambda value the engine operates on, ef is the exhaust flow rate, T is exhaust temperature, NH$_3$Des is a function that returns the amount of NH$_3$ desorption, NH$_3$Stored in the amount of NH$_3$ stored in the SCR, SCRT is SCR temperature, NH$_3$CVT is a function that returns the amount of NH$_3$ that is converted to N$_2$ and H$_2$O, and NO$_x$SCR is the amount of NO$_x$ flowing into the SCR. The modeled amount of NH$_3$ slip may be determined via the following equation:

$$NH_3SlipMod=NH_3Des(NH_3Stored,SCRT,ef,Lambda)$$

where NH$_3$SlipMod is the modeled amount of NH$_3$ slip from the SCR and the variables are as previously described. The functions NH$_3$In, NH$_3$Des, and NH$_3$CVT may be empirically determined via operating an engine on a dynamometer and recording emissions from the engine and tailpipe, or alternatively, they may be determined via equations. Method 500 proceeds to 518.

At 518, method 500 adjusts the amount of NH$_3$ that is estimated to be stored within the SCR. The amount of NH$_3$ that is estimated to be stored within the SCR may be determined via numerically integrating NH$_3$In(Lambda,ef,T)−NH$_3$Des(NH$_3$Stored,SCRT,ef,Lambda)−NH$_3$CVT (NO$_x$SCR,T). The corrected amount of NH$_3$ stored in the SCR for static conditions may be determined via the following equation:

$$NH_3StorCor=NH_3Stor+Kcor*(NH_3slip-NH_3SlipMod)$$

where NH$_3$StorCor is the corrected amount of NH$_3$ stored in the SCR, NH$_3$Stor is the uncorrected amount of NH$_3$ stored in the SCR, NH$_3$slip is the estimated amount of NH$_3$ slip past the SCR, Kcor is a scalar gain (e.g., a real number between 0 and 1), and NH$_3$SlipMod is the modeled amount of NH$_3$ slip past the SCR.

The corrected estimated amount of NH$_3$ stored in the SCR for dynamic conditions may be determined via the following equation:

$$\frac{d}{dt}NH_3Stored = $$
$$NH_3\ln(Lambda, ef, T) - NH_3Des(NH_3Stored, SCRT, ef, Lambda) - $$
$$NH_3CVT(NOxSCR, T) + Kcor \cdot (NH_3slip - NH_3SlipMod)$$

where the variables are as previously described. The right hand side of this equation may be numerically integrated to determine the corrected amount of NH$_3$ that is stored in the SCR. Method 500 proceeds to 520.

At 520, method 500 adjusts an amount of fuel that is delivered to the engine according to the corrected amount of NH$_3$ that is stored in the SCR. In one example, if the corrected amount of NH$_3$ that is stored in the SCR is less than a first threshold, additional NH$_3$ may be generated via operating the engine at a rich air-fuel ratio so that more NH$_3$ may be stored in the SCR. If the corrected amount of NH$_3$ that is stored in the SCR is greater than a second threshold, generation of additional NH$_3$ may be ceased via operating the engine at a lean air-fuel ratio so that NH$_3$ may be utilized in the SCR. The first and second thresholds may be a function of SCR temperature.

Additionally, the NH$_3$ slip estimate NH3slip may be used to monitor the health and presence of the SCR system. Specifically, when the observer predicts NH$_3$ slip by a tailpipe oxygen sensor switch before the CMS by some time, but the observed tailpipe oxygen sensor switching event occurs after the switching of the CMS, this may indicate degradation in either in the SCR hardware, or the algorithms that predict NH$_3$ generation and desorption. Method 500 proceeds to exit.

In this way, two oxygen sensors may be a basis for an observer that corrects an estimated amount of NH$_3$ that is stored within a SCR. By improving the estimate of NH$_3$ that is stored in the SCR, it may be possible to reduce NH$_3$ slip and improve NO conversion.

Referring now to FIG. 6, a second method for controlling NO and NH$_3$ of a gasoline vehicle that is equipped with a SCR and a NO or NH$_3$ sensor that is based on a second observer is shown. The method of FIG. 6 may be incorporated into and may cooperate with the system of FIG. 1. Further, at least portions of the method of FIG. 6 may be incorporated as executable instructions stored in non-transitory memory of controller 12 while other portions of the method may be performed via a controller transforming operating states of devices and actuators in the physical world.

At 602, method 600 determines operation conditions. Operating conditions may include but are not limited to ambient temperature, engine temperature, engine speed, barometric pressure, engine intake manifold temperature, SCR temperature, operating states of oxygen sensors, NO sensors, and NH$_3$ sensors, and driver demand torque. The engine operating conditions may be determined via the various sensors described herein. Method 600 proceeds to 604.

At 604, method 600 determines the amount of NH$_3$ slip that passes through the SCR. Method 600 determines the amount of NH$_3$ slip that passes through the SCR via the NH$_3$ or NO$_x$ sensor that is positioned downstream of the SCR. Method 600 proceeds to 606.

At 606, method 600 judges if NH$_3$ slip is present. If so, the answer is yes and method 600 proceeds to 608. Otherwise, the answer is no and method 600 proceeds to 607.

At 607, method 600 determines a corrected amount of NH$_3$ stored in the SCR during static conditions. The corrected amount of NH$_3$ stored in the SCR for static conditions may be determined via the following equation:

$$NH_3StorCor=NH_3Stor+Kcor*(NH_3meas-NH3SlipMod)$$

where NH$_3$StorCor is the corrected amount of NH$_3$ stored in the SCR, NH$_3$Stor is the uncorrected amount of NH$_3$ stored in the SCR, NH$_3$measured is the measured amount of NH$_3$ that slips past the SCR as determined via the NH$_3$ or NO sensor, Kcor is a scalar gain (e.g., a real number between 0 and 1), and NH$_3$SlipMod is the modeled amount of NH$_3$ slip past the SCR as previously described. Method 600 proceeds to 610.

At 608, method 600 determines the corrected estimated amount of NH$_3$ stored in the SCR for dynamic conditions via the following equation:

$$\frac{d}{dt} \text{NH}_3 Store = $$
$$\text{NH}_3 \ln(\text{Lambda}, ef, T) - \text{NH}_3 Des(\text{NH}_3 Stored, SCRT, ef, \text{Lambda}) - $$
$$\text{NH}_3 CVT(\text{NO}xSCR, T) + Kcor \cdot (\text{NH}_3 meas - \text{NH}_3 Slip \text{Mod})$$

where the variables are as previously described. The right hand side of this equation may be numerically integrated to determine the corrected amount of NH$_3$ that is stored in the SCR. Method 600 proceeds to 610.

At 610, method 600 adjusts an amount of fuel that is delivered to the engine according to the corrected amount of NH$_3$ that is stored in the SCR. In one example, if the corrected amount of NH$_3$ that is stored in the SCR is less than a first threshold, additional NH$_3$ may be generated via operating the engine at a rich air-fuel ratio so that more NH$_3$ may be stored in the SCR. If the corrected amount of NH$_3$ that is stored in the SCR is greater than a second threshold, generation of additional NH$_3$ may be ceased via operating the engine at a lean air-fuel ratio so that NH$_3$ may be utilized in the SCR. The first and second thresholds may be a function of SCR temperature.

Additionally, the measured NH$_3$ slip NH$_3$meas may be used to monitor the health and presence of the SCR system. Specifically, when the second observer predicts NH$_3$ slip is greater than the first threshold, but the observed or measured NH$_3$ slip is less than the second threshold, this may indicate degradation (e.g., performance that is less than may expected) in either in the SCR hardware, or the algorithms that predict NH$_3$ generation and desorption. Method 600 proceeds to exit.

In this way, a NO or NH$_3$ sensors may be a basis for a second observer that corrects an estimated amount of NH$_3$ that is stored within a SCR. By improving the estimate of NH$_3$ that is stored in the SCR, it may be possible to reduce NH$_3$ slip and improve NOx conversion.

Thus, the methods of FIGS. 5 and 6 provide for a method for operating an engine, comprising: estimating an amount of NH$_3$ stored in a selective catalytic reductant catalyst (SCR) via a controller; correcting the amount of NH$_3$ stored in the SCR via the controller in response to output of first oxygen sensor and output of a second oxygen sensor; and adjusting an amount of fuel injected to an engine via the controller according to the corrected amount of NH$_3$ stored in the SCR. The method further comprises delivering a rich air-fuel ratio to an engine to correct the amount of NH$_3$ stored in the SCR. The method further comprises correcting the output of the first oxygen sensor and output of the second oxygen sensor for voltage offsets. The method further comprises correcting the amount of NH$_3$ stored in the SCR via integrating a difference between the output of the first oxygen sensor and output of the second oxygen sensor. The method further comprises correcting the amount of NH$_3$ stored in the SCR based on the integrated difference between the output of the first oxygen sensor and output of the second oxygen sensor.

In some examples, the method further comprises correcting the amount of NH$_3$ stored in the SCR based on an estimated amount of NH$_3$ slip past the SCR. The method includes where adjusting the amount of fuel injected to the engine includes enriching an engine air-fuel in response to the corrected amount of NH$_3$ stored in the SCR being less than a first threshold. The method includes where adjusting the amount of fuel injected to the engine includes leaning an engine air-fuel in response to the corrected amount of NH$_3$ stored in the SCR being greater than a second threshold. The method includes where the first threshold and the second threshold are functions of SCR temperature.

The methods of FIGS. 5 and 6 also provide for a method for operating an engine, comprising: estimating an amount of NH$_3$ stored in a selective catalytic reductant catalyst (SCR) via a controller; correcting the amount of NH$_3$ stored in the SCR via the controller in response to output of first oxygen sensor and output of a second oxygen sensor; and indicating SCR degradation to a vehicle occupant or service center via the controller in response to an ob server predicting NH$_3$ slip by the second oxygen sensor switch before the first oxygen sensor switches, but where second oxygen sensor switches state after the first oxygen sensor switches state. The method further comprises adjusting engine operation in response to the observer predicting NH$_3$ slip by the second oxygen sensor switch before the first oxygen sensor switches, but where second oxygen sensor switches state after the first oxygen sensor switches state. The method includes where adjusting engine operation includes adjusting fuel injection timing and/or spark timing of the engine. The method further comprises generating a NH$_3$ storage correction amount via the observer. The method includes where the observer generates the NH$_3$ storage correction amount via output of the first oxygen sensor and output of the second oxygen sensor. FIGS. 7-9 illustrate various methods for providing ammonia to the SCR in response to a comparison between an ammonia store and a threshold ammonia store. In one example, the method 700 of FIG. 7 may be initiated in response to the ammonia store prior to initiation of the method 800 of FIG. 8. If the method 700 does not meet an ammonia demand based on the ammonia store, then the method 800 may be initiated.

In one example, the method 800 may be a continuation of method 700, wherein the method 700 includes enriching an air/fuel ratio to a first air/fuel ratio, and the method 800 includes enriching the air/fuel ratio to a second air/fuel ratio, richer than the first air/fuel ratio. Additionally or alternatively, due to ammonia generation within the TWC, the methods 700 and 800 may be executed separately. The richer air/fuel ratio may comprise a greater amount of fuel to air relative to a leaner air/fuel ratio. However, each of the first air/fuel ratio and the second air/fuel ratio are rich of stoichiometry. The first air/fuel ratio may be based on CO generation during the enriching, wherein CO generation is less than a lower CO threshold during the method 700. In one example, the lower CO threshold is based on NH$_3$ generation capable of meeting a plurality of ammonia demands while maintaining CO generation relatively low. The second air/fuel ratio may be based on a greater NH$_3$ demand, wherein CO generation increases above the lower CO threshold. The second amount may satisfy higher NH$_3$ demands such that NO may be reduced in the SCR. Thus, and as will be described herein, the method 800 may be initiated if the method 700 does not meet an ammonia demand.

Turning now to FIG. 7, it shows the method 700 for providing ammonia to an SCR in response to an increase in an exhaust mass flow rate. At 702, the method 700 may include determining a rate of change of ammonia based on ammonia slip through the SCR at 704, ammonia converted (e.g., consumed) at the SCR at 706, and ammonia being adsorbed at 708. Ammonia converted may be estimated based on an engine NO output, current ammonia flow to the SCR, and ammonia slip through the SCR.

At 710, the method 700 may include determining an SCR ammonia store, as described above with respect to FIGS. 5 and 6.

At 712, the method 700 may include determining an ammonia demand. The ammonia demand may be based on the ammonia rate of change and the SCR ammonia store. For example, if the SCR ammonia store is less than a threshold store and the ammonia rate of change is a negative value such that the SCR ammonia store is decreasing, then the ammonia demand may be relatively high.

At 714, the method 700 may include determining an air mass rate of change (am_dt). In one example, am_dt may be an approximate derivation of air mass based on one or more of an estimate of mass flow as it reaches the engine exhaust, a low passed filtered air mass, a time constant of the filter, a time interval between samples of the mass flow, and a previous sample value. The time constant of the filter may be 20 seconds. The time interval of the method update sample time, dt, may be between 20 to 30 milliseconds.

At 716, the method 700 may include determining if am_dt is greater than a threshold air mass change and if ammonia is demanded. The threshold air mass change may be equal to a non-zero, positive value. The threshold air mass change may be based on an air mass rate of change at which a set point increase is desired to flow ammonia to the SCR while reducing an amount of CO generated due to the rich combustion. The threshold air mass change is graphically illustrated in FIGS. 10A-C. In one example, am_dt may exceed the threshold air mass change during vehicle accelerations or other transient conditions. Ammonia may be demanded if the SCR ammonia store is less than a threshold store and the ammonia rate of change is negative.

If ammonia is not demanded and/or am_dt is less than the threshold air mass change then at 718, the method 700 may include not enriching the air/fuel ratio. As such, the air/fuel ratio may remain at stoichiometric or lean.

If ammonia is demanded and am_dt is greater than or equal to the threshold air mass change, then at 720 the method 700 may include enriching the air/fuel ratio. As such, fuel delivered to the engine may increase relative to the amount of air provided. In one example, the air/fuel ratio is reduced to a first air/fuel ratio. The first air/fuel ratio may be rich of stoichiometric.

At 722, the method 700 may include flowing ammonia to the SCR. The TWC may reduce NO to ammonia in the presence of a reductant, such as fuel. In one example, during the method 700 the rich fueling is calibrated such that a front of the TWC is reduced via the rich air/fuel ratio while a mid-bed (e.g., a portion downstream of the front) of the TWC remains oxidized to treat carbon emissions.

At 724, the method 700 may include determining if the ammonia demand is met. Determining if the ammonia demand is met may include comparing the ammonia produced via the TWC to the amount of ammonia demanded. If the ammonia demand is met, then at 726, the method 700 may include maintaining current operating parameters until the SCR ammonia store is greater than the threshold store or until the am_dt is less than the threshold mass rate change.

In some examples of the method 700, the enrichment of the air/fuel ratio may be interrupted and restarted following a subsequent increase in am_dt without incorporating the further enrichment discussed in FIG. 8 below. The controller may determine that the ammonia demand may be met via the lower enrichment provided by method 700 over a period of time, which may decrease fuel consumption and carbon emissions relative to the method 800 of FIG. 8. The period of time may be a fixed value. Additionally or alternatively, the period of time may be dynamic value based on a current and a predicted NO engine output, ammonia store, and ammonia generation. The controller may determine a current ammonia replenishment of the SCR is unable to treat the NO output or upcoming NO output and the steps of method 800 may be executed.

If the ammonia demand is not met, then the method 700 may proceed to 802 of the method 800 of FIG. 8. The method 800 shows a method for further enriching the exhaust gases. By doing this, the front portion and a mid-bed portion may be used to reduce NO to ammonia. The method 800 may be calibrated such that the reduction of the TWC may leave portions of the mid-bed oxidized for treating hydrocarbon and CO emissions. It will be appreciated that by using the TWC to generate ammonia, an oxidation capability of the TWC is reduced. Thus, a balance between generating ammonia and the oxidation capability of the TWC is achieved.

At 802, the method 800 may include determining the ammonia demand is greater than a lower threshold demand and the am_dt is less than the threshold air mass change. If at least one of the ammonia demand is not greater than the lower threshold demand or the am_dt is not greater than the threshold air mass change, then at 804, the method 800 may include to not further enriching the air/fuel ratio (e.g., decreasing the air/fuel ratio). In one example, the air/fuel ratio is increased (e.g., leaned). The method 800 may then proceed to 716 of FIG. 7 and supplies ammonia to the SCR only via a first determined reduction in the air/fuel ratio. The first determined reduction being based on an increase in ammonia generation while mitigating CO generation to a lower threshold. In this way, the air/fuel ratio is not further enriched to a second amount when the air mass flow is above the threshold air mass change.

If both of the ammonia demand is greater than the lower threshold and the am_dt is less than the threshold air mass change, then at 806, the method 800 may include TWC parameters. The TWC parameters may include mid-bed parameters used to determine when mid-bed modulation occurs. TWC parameters may include a TWC temperature and modulation conditions.

At 808, the method 800 may include further reducing the TWC oxidation state and flowing more ammonia to the SCR by decreasing the air/fuel ratio. In one example, the routine of ammonia generation during the method 800 may be less efficient than the routine of ammonia generated during the method 700. In one example, a greater amount of CO and HCs may accompany the $NH_3$ during the method 800 relative to the method 700. For this reason, execution of the method 800 may be limited to conditions where the method 700 may not meet the ammonia demand alone. The air/fuel ratio may be reduced to a second air/fuel ratio less than the first air/fuel ratio. As such, the second air/fuel ratio may be used during non-transient conditions where the am_dt is less than the threshold air mass rate of change. The second air/fuel ratio may be accompanied by an increase in CO and hydrocarbon output relative to the first air/fuel ratio.

Turning now to FIG. 9, an embodiment of a method 900 for providing ammonia to the SCR during a transition to a closed loop operation from an open loop operation comprising a two-stage regeneration after a fuel cut-off event is shown. The method 900 starts at 902 where it is determined if the accelerator pedal is released. Additionally or alternatively, a brake pedal may be depressed or a vehicle speed may be decreasing. If at 902, the accelerator pedal is not released (NO) the method returns to the start. If at 902, the accelerator pedal is released the method proceeds to 904. At 904, a fuel cut-off operation is enabled and fuel cut off for the duration of the deceleration event. During the fuel cut-off operation, fuel is not provided to the engine. As such, injectors may be deactivated and combustion may cease. The method proceeds to 906 wherein fueled engine operating parameters may resume. Fueled engine operation may include providing fuel to the engine and executing combustion.

At 906, it is determined if the catalyst temperature is greater than the threshold temperature. If the catalyst temperature is not greater than the threshold temperature (NO) the method proceeds to step 908 where the engine is not operated rich until the catalyst temperature is greater than the threshold temperature. If the catalyst temperature is greater than the threshold temperature (YES) the method proceeds to 910.

At 910, the amount of oxygen stored in the catalyst is estimated. This estimate may be based on engine speed, load, and air/fuel ratio as well as input from an upstream UEGO or downstream HEGO, a catalyst temperature sensor and others. The estimate may be based specifically upon mass airflow inducted into the engine and catalyst temperature. The estimate may be further based on the ammonia request and the SCR ammonia store. At 912, the engine is operated rich. This rich operation may be part of a first-stage, open loop regeneration where rich operation proceeds for a predetermined period of time, which may include flowing $NH_3$ to the SCR device. In one example, the air/fuel ratio is equal to a third air/fuel ratio, lower than each of the second air/fuel ratio and the first air/fuel ratio.

At 913, the method includes determining if the ammonia demand is less than an upper threshold demand. The upper threshold demand may be greater than the lower threshold demand. If the ammonia demand is not less than the upper threshold demand (e.g., greater than or equal to), then the ammonia demand during method 900 may be greater than the demands in each of methods 700 and 800 of FIGS. 7 and 8, respectively. At 914, the method may include prolonging a rich operation during the transition from open loop to closed loop. In one example, this may include extending rich operation to generate and flow $NH_3$ to the SCR device following regeneration of the TWC relative to a baseline transition duration (e.g., a transition duration when ammonia is not requested). Said another way, open loop operation of the air/fuel ratio rich of stoichiometry may be maintained until a predetermined time has passed. The predetermined time may be a non-zero, positive value greater than the baseline transition duration. In one example, the predetermined time may be a dynamic value based on an ammonia demand and/or the estimate of oxygen stored in the SCR device. For example, the predetermine time may increase as the ammonia demand increases and/or the estimate of oxygen storage increases. The method may maintain and hold the rich set point until the predetermined time has passed prior to proceeding to 915 when ammonia is demanded.

If the ammonia demand is less than the upper threshold, then the method proceeds to 915.

At 915, the estimate for the amount of oxygen stored in the catalyst (from 910) is adjusted based on the rich operation of 912 and/or 914. In one example, once the ammonia demand decreases below the upper threshold, during a baseline duration of the transition or during the prolonged duration of the transition, the method proceeds to 915. If the method proceeds to 915 from 913, then the transition is not prolonged and ammonia is not generated during the transition. An ammonia demand, if present, may be met via the methods 700 and 800 of FIGS. 7 and 8, respectively.

At 916, it is determined if the percentage of catalyst oxygen storage depleted by rich operation of the engine is greater than the desired percentage of the total oxygen storage. If the amount of oxygen storage depleted is not greater than the desired percentage (NO) the method returns to step 912 where the rich operation of the engine is continued. If the percentage of oxygen storage depleted is greater than the desired percentage (YES) the method proceeds to step 918. At 918, the air/fuel ratio is controlled by two-stage feedback control based on input from a downstream HEGO sensor. In this way, switching from open loop control to feedback control to average air/fuel ratio around said value rich of stoichiometry may occur when a desired percentage of the catalyst oxygen storage is depleted. Furthermore, the predetermined time for operating by open loop control may be related to a preselected amount of oxygen storage remaining in the catalyst or catalyst temperature.

Turning now to FIGS. 10A, 10B, and 10C, they show engine operating sequences 1000, 1020, and 1040 for an operation without producing ammonia, an operation producing ammonia during accelerations, and an operation producing ammonia outside of accelerations, respectively. In each of the operating sequences, the example vehicle speed is identical.

Turning to FIG. 10A, it shows a drive cycle 1000. An outer loop set point, represented in phi, is slightly rich of stoichiometric based on engine speed, engine load, and an engine temperature. Phi is an inverse of lambda, wherein lambda represent normalized air/fuel ratio. Thus, an increase in phi corresponds with a decrease in lambda which is associated with the air/fuel ratio being enriched. Plot 1002 illustrates a vehicle speed. Plot 1004 illustrates am_dt (interchangeably referred to as a low pass filtered air mass above). Plot 1006 illustrates a set point adder to the outer loop control configured to trigger when am_dt exceeds the threshold mass air rate of change. However, in the drive cycle 1000, the set point adder is disabled and the plot 1006 is constant (e.g., 0). Plots 1010, 1012, and 1014 illustrate reductants CO, non-methane hydrocarbons (NMHC), and ammonia in grams per second. The reductants may slip past the TWC in relatively small quantities. As illustrated, ammonia is released without the adder during only one of the accelerations and is accompanied by CO. The amount of CO is less than the amount of ammonia.

Turning to FIG. 10B, it shows a drive cycle 1020. Plot 1022 illustrates an example vehicle speed. Plot 1024 illustrates am_dt (interchangeably referred to as a low pass filtered air mass above) and plot 1026 illustrates the set point adder to the outer loop control triggered when am_dt exceeds the threshold air mass rate of change. Dashed line 1028 illustrates the set point adder value when disabled. Plots 1030, 1032, and 1034 illustrate CO, NMHC, and ammonia in grams per second. As illustrated, the air/fuel ratio is enriched each time the am_dt exceeds the threshold mass air flow change. Relative to the drive cycle 1000, ammonia is produced more frequently during the drive cycle 1020 via the set point adder being activated and allowing the air/fuel ratio to be enriched. The ammonia generation is accompanied by a relatively small amount of CO. As illustrated in the drive cycle 1020

Turning to FIG. 10C, it shows a drive cycle 1040. Plot 1042 illustrates an example vehicle speed. Plot 1044 illustrates am_dt (interchangeably referred to as a low pass filtered air mass above) and plot 1046 illustrates the set point adder to the outer loop control triggered when am_dt exceeds the threshold air mass rate of change. Adjustments to the set point adder are disabled in drive cycle 1040. Thus, the plot 1046 remains constant. Plots 1050, 1052, and 1054 illustrate CO, NMHC, and ammonia in grams per second. In drive cycle 1040, the set point adder may be higher than the set point adder of drive cycle 1020. Additionally, the set point adder may not be active when am_dt exceeds the threshold air mass change. At the start of the drive cycle 1040 prior to t1, the air/fuel ratio may be enriched to a first threshold air/fuel ratio. In one example, the first threshold air/fuel ratio is 1.01 phi. Relatively large quantities of CO and ammonia break through the TWC. After t1, the air/fuel ratio is equal to a second threshold air/fuel ratio, which is greater than the first threshold air/fuel ratio and less than stoichiometric. Additionally, the second threshold air/fuel ratio is less than the enriched air/fuel ratio of drive cycle 1020 during accelerations or other conditions resulting in am_dt to exceed the threshold air mass change. In one example, the second threshold air/fuel ratio is equal to 1.002 phi. During the second threshold air/fuel ratio, ammonia is released along with a higher amount of CO relative to the drive cycle 1020. Furthermore, the TWC may release ammonia in surges (e.g., not continuously) and demands some amount of time for ammonia to build up therein prior to being released even when the air/fuel ratio is maintained at the second threshold air/fuel ratio.

In one example, as illustrated in drive cycles 1020 and 1040 of FIGS. 10B and 10C, it may be desired to wait a threshold duration of time between rich closed loop operations. For example, it may be desired to accumulate ammonia within the TWC between rich operation of the engine. The threshold duration may be a dynamic value based on the air/fuel ratio and air flow to the TWC. For example, as the air/fuel ratio and/or the air flow increases, the threshold duration may decrease. Additionally or alternatively, the threshold duration of time may be shorter during the drive cycle 1020 relative to the drive cycle 1040 due to less ammonia being released from the TWC.

In some embodiments, am_dt may be intrusively increased in response to an ammonia request being present and less than the lower threshold. Intrusively increasing am_dt may include increasing a compressor speed to higher than a desired amount. By doing this, an engine power output may be higher than a requested engine power output. Extra engine power output may be used to charge an energy storage device, power auxiliary components, or the like. Thus, in some examples, the am_dt may be intrusively increased only when the extra engine power output may be used to power other components.

The disclosure provides support for a method for operating an engine, the method including estimating an amount of $NH_3$ stored in a selective catalytic reductant catalyst (SCR) via a controller and adjusting an air/fuel ratio in response to the amount of $NH_3$ stored in the SCR being less than a threshold $NH_3$ store. A first example of the method further including where an $NH_3$ demand is present and proportional to a difference between the amount of $NH_3$ stored in the SCR and the threshold $NH_3$ store, further comprising comparing the $NH_3$ demand to a lower threshold demand. A second example of the method, optionally including the first example, further includes where adjusting the air/fuel ratio in response to the $NH_3$ demand being less than the lower threshold demand is executed when an air mass rate of change is greater than or equal to a threshold air mass rate of change. A third example of the method, optionally including one or more of the previous examples, further includes where adjusting the air/fuel ratio in response to the $NH_3$ demand being greater than the lower threshold demand and less than an upper threshold demand is executed when the air mass rate of change is less than the threshold air mass rate of change. A fourth example of the method, optionally including one or more of the previous examples, further includes where adjusting the air/fuel ratio when the air mass rate of change is greater than or equal to the threshold air mass rate of change comprises decreasing the air/fuel ratio to a first air/fuel ratio. A fifth example of the method, optionally including one or more of the previous examples, further includes where adjusting the air/fuel ratio when the air mass rate of change is less than the threshold air mass rate of change comprises decreasing the air/fuel ratio to a second air/fuel ratio, the second air/fuel ratio less than the first air/fuel ratio.

The disclosure provides support for a system including a three-way catalyst (TWC) arranged upstream of a selective catalytic reductant catalyst (SCR) relative to a direction of exhaust gas flow, and a controller comprising instructions stored on non-transitory memory thereof that when executed enable the controller to decrease an air/fuel ratio in response to an $NH_3$ store of the SCR being less than a threshold $NH_3$ store. A first example of the system further includes where the instructions further enable the controller to decrease the air/fuel ratio to a first air/fuel ratio in response to an $NH_3$ demand being less than a lower threshold demand and a rate of change of an air mass provided to an engine being greater than or equal to a threshold rate of change. A second example of the system, optionally including the first example, further includes where the air mass provided to the engine is greater than or equal to the threshold rate of change during an acceleration. A third example of the system, optionally including one or more of the previous examples, further includes where the instructions further enable the controller to decrease the air/fuel ratio to a second air/fuel ratio in response to the $NH_3$ demand being greater than the lower threshold demand and less than an upper threshold demand and the rate of change of the air mass provided to the engine being less than the threshold rate of change, the second air/fuel ratio is less than the first air/fuel ratio. A fourth example of the system, optionally including one or more of the previous examples, further includes where the instructions further enable the controller to decrease the air/fuel ratio to a third air/fuel ratio in response to the $NH_3$ demand being greater than the upper threshold demand during a transition from open loop to closed loop fuel control. A fifth example of the system, optionally including one or more of the previous examples, further includes where the instructions further enable the controller to prolong the transition relative to a baseline duration when the $NH_3$ demand is greater than the upper threshold demand. A sixth example of the system, optionally including one or more of the previous examples, further includes where the transition from open loop fuel control to the closed loop fuel control occurs following a fuel cut-off event. A seventh example of the system, optionally including one or more of the previous examples, further includes where the third air/fuel ratio is greater than the second air/fuel ratio. An eighth example of the system, optionally including one or more of the previous examples, further includes where the NH₃store is a corrected amount in response to output of a first oxygen sensor and output of a second oxygen sensor.

The disclosure further provides support for a method for operating an engine, the method including estimating an amount of NH₃ stored in a selective catalytic reductant catalyst (SCR) via a controller, correcting the amount of NH₃ stored in the SCR via the controller in response to output of first oxygen sensor and output of a second oxygen sensor, and adjusting an air/fuel ratio in response to the amount of NH₃ stored in the SCR being less than a threshold NH₃ store. A first example of the method where includes where adjusting the air/fuel ratio comprises decreasing the air/fuel ratio to a first air/fuel ratio in response to a rate of change of an air mass exceeding a threshold air mass rate of change. A second example of the method, optionally including the first example, further includes where adjusting the air/fuel ratio comprises decreasing the air/fuel ratio to a second air/fuel ratio in response to the rate of change of the air mass being less than the threshold air mass rate of change, wherein the second air/fuel ratio is less than the first air/fuel ratio. A third example of the method, optionally including one or more of the previous examples, further includes where adjusting the air/fuel ratio comprises decreasing the air/fuel ratio to a third air/fuel ratio in response to a transition from a fuel cut-off operation to a fueled operation, wherein the third air/fuel ratio is less than the second air/fuel ratio and each of the first, second, and third air/fuel ratios are rich of stoichiometry. A fourth example of the method, optionally including one or more of the previous examples, further includes prolonging the transition when the air/fuel ratio is equal to the third air/fuel ratio, and a magnitude of the prolonging is proportional to a difference between the amount of NH₃ stored in the SCR and the threshold NH₃ store.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, I6, V6, V8, V10, and V12 engines operating in natural gas, gasoline, or alternative fuel configurations could use the present description to advantage.

The invention claimed is:

1. A method for operating an engine, comprising:
   estimating an amount of NH₃ stored in a selective catalytic reductant catalyst (SCR) via a controller;
   decreasing an air/fuel ratio to a first air/fuel ratio in response to the amount of NH₃ stored in the SCR being less than a threshold NH₃ store and an NH₃ demand being less than a lower threshold demand; and
   decreasing the air/fuel ratio to a second air/fuel ratio in response to the NH₃ demand being greater than the lower threshold demand, the second air/fuel ratio less than the first air/fuel ratio.

2. The method of claim 1, wherein an NH₃ demand is present and proportional to a difference between the amount of NH₃ stored in the SCR and the threshold NH₃ store.

3. The method of claim 1, further comprising decreasing the air/fuel ratio to the first air/fuel ratio is in response to the NH₃ demand being less than the lower threshold demand is executed when an air mass rate of change is greater than or equal to a threshold air mass rate of change.

4. The method of claim 1, wherein adjusting the air/fuel ratio to the second air/fuel ratio in response to the NH₃ demand being greater than the lower threshold demand and less than an upper threshold demand is executed when an air mass rate of change is less than a threshold air mass rate of change.

5. The method of claim 1, further comprising prolonging rich operation during a rich transition from open loop to closed loop control following an accelerator pedal being released in response to an ammonia demand being greater than or equal to an upper threshold demand.

6. The method of claim 5, further comprising maintaining the rich transition until a percentage of an oxygen storage depleted in a catalyst upstream of the SCR is greater than a desired percentage of total oxygen storage.

7. A system, comprising:
   a three-way catalyst (TWC) arranged upstream of a selective catalytic reductant catalyst (SCR) relative to a direction of exhaust gas flow; and
   a controller comprising instructions stored on non-transitory memory thereof that when executed enable the controller to:
      decrease an air/fuel ratio to a first air/fuel ratio in response to an NH₃ store of the SCR being less than a threshold NH₃ store, an NH₃ demand being less than a lower threshold demand, and a rate of change of an air mass provided to an engine being greater than or equal to a threshold rate of change; and
      decrease the air/fuel ratio a second air/fuel ratio, less than the first air/fuel ratio, in response to the NH₃ demand being greater than the lower threshold demand and the rate of change of an air mass provided to the engine being less than the threshold rate of change.

8. The system of claim 7, wherein the air mass provided to the engine is greater than or equal to the threshold rate of change during an acceleration.

9. The system of claim 7, wherein the instructions further enable the controller to decrease the air/fuel ratio to a third air/fuel ratio in response to the NH₃ demand being greater than the upper threshold demand during a transition from open loop to closed loop fuel control.

10. The system of claim 9, wherein the instructions further enable the controller to prolong the transition relative to a baseline duration when the $NH_3$ demand is greater than the upper threshold demand.

11. The system of claim 9, wherein the transition from open loop fuel control to the closed loop fuel control occurs following a fuel cut-off event.

12. The system of claim 9, wherein the third air/fuel ratio is greater than the second air/fuel ratio.

13. The system of claim 7, wherein the $NH_3$ store is a corrected amount in response to output of a first oxygen sensor and output of a second oxygen sensor.

14. A method for operating an engine, comprising:
estimating an amount of $NH_3$ stored in a selective catalytic reductant catalyst (SCR) via a controller;
correcting the amount of $NH_3$ stored in the SCR via the controller in response to output of a first oxygen sensor and output of a second oxygen sensor; and
adjusting an air/fuel ratio in response to the amount of $NH_3$ stored in the SCR being less than a threshold $NH_3$ store.

15. The method of claim 14, wherein adjusting the air/fuel ratio comprises decreasing the air/fuel ratio to a first air/fuel ratio in response to a rate of change of an air mass exceeding a threshold air mass rate of change.

16. The method of claim 15, wherein adjusting the air/fuel ratio comprises decreasing the air/fuel ratio to a second air/fuel ratio in response to the rate of change of the air mass being less than the threshold air mass rate of change, wherein the second air/fuel ratio is less than the first air/fuel ratio.

17. The method of claim 16, wherein adjusting the air/fuel ratio comprises decreasing the air/fuel ratio to a third air/fuel ratio in response to a transition from a fuel cut-off operation to a fueled operation, wherein the third air/fuel ratio is less than the second air/fuel ratio and each of the first, second, and third air/fuel ratios are rich of stoichiometry.

18. The method of claim 17, further comprising prolonging the transition when the air/fuel ratio is equal to the third air/fuel ratio, and a magnitude of the prolonging is proportional to a difference between the amount of $NH_3$ stored in the SCR and the threshold $NH_3$ store.

* * * * *